United States Patent [19]

Robinson

[11] 4,131,881
[45] Dec. 26, 1978

[54] COMMUNICATION SYSTEM INCLUDING ADDRESSING APPARATUS FOR USE IN REMOTELY CONTROLLABLE DEVICES

[76] Inventor: Paul B. Robinson, Durham, N.H.

[21] Appl. No.: 832,795

[22] Filed: Sep. 12, 1977

[51] Int. Cl.² ............................................. H04Q 9/00
[52] U.S. Cl. ............................ 340/167 R; 340/151; 340/310 A; 340/163
[58] Field of Search ............... 340/167 R, 150, 151, 340/310 A, 163

[56] References Cited

U.S. PATENT DOCUMENTS 3,656,112  4/1972  Paull .................................. 340/151
3,702,460  11/1972 Blose .................................. 340/150
3,900,842  8/1975  Calabro ........................... 340/310 A
3,924,224  12/1975 Dyer ................................ 340/310 A
3,942,170  3/1976  Whyte .............................. 340/310 A Primary Examiner—Harold I. Pitts

[57] ABSTRACT

A data communication system includes apparatus for use in each of a plurality of simultaneously addressable terminal units. Means are provided for recognizing a large number of addresses to allow the selective addressing of any single terminal unit, simultaneous addressing of all terminal units, or the selective simultaneous addressing of various groups and sets of terminal units.

16 Claims, 5 Drawing Figures

FIG. 5

|  | $0_8$ | $1_8$ | $2_8$ | $3_8$ | $4_8$ | $5_8$ | $6_8$ | $7_8$ | $10_8$ | $11_8$ | $12_8$ | $17_8$ | $1777776_8$ |
|---|---|---|---|---|---|---|---|---|---|---|---|---|---|
| $0_8$ | TU 00 | TU 10 | TU 20 |  |  |  |  | TU 70 | TU 100 |  |  |  | TU 1777760 |
| $1_8$ | TU 01 | TU 11 | TU 21 |  |  |  |  | TU 71 | TU 101 |  |  |  | TU 1777761 |
| $2_8$ |  |  |  |  |  |  |  |  |  |  |  |  |  |
| $3_8$ |  |  |  |  |  |  |  |  |  | TU 113 |  |  |  |
| $4_8$ |  |  |  |  |  |  |  |  |  |  |  |  |  |
| $5_8$ |  |  |  |  |  |  |  |  |  |  |  |  |  |
| $6_8$ |  |  |  |  |  |  |  |  |  |  |  |  |  |
| $7_8$ | TU 07 | TU 17 | TU 27 |  |  |  |  | TU 77 | TU 107 |  |  |  | TU 1777767 |

BITS 1–16 (columns)

BITS 17–19 (rows)

COMMUNICATION SYSTEM INCLUDING ADDRESSING APPARATUS FOR USE IN REMOTELY CONTROLLABLE DEVICES

BACKGROUND OF THE INVENTION

This invention relates generally to data communciation systems and addressing apparatus therefore, and more particularly to address assignment and recognition apparatus for use in large numbers of terminal devices found in such systems.

In various types of data communication and control systems, some type of message generator, such as a computer, is provided to transmit messages containing command and address data to remotely located terminal units. In order for a terminal unit to react to command functions specified by a message, that unit must first recognize the message address.

The terminal units used in the types of communication systems being considered generally contain some type of address recognition logic or circuitry designed to recognize a specific address. The recognizing of an address by this logic effectuates the generation of an enable signal which directs the recognizing terminal unit to carry out its designed function or functions as specified by the command portion of the received message.

In some types of communication systems, it is desirable to be able to selectively address large numbers of remote terminal units. Typical of these systems are automatic remote meter reading and control systems used for collecting meter data from consumer residences and controlling loads at those residences. In these types of systems, messages or commands and data are transferred between a message generator and the remote terminals over various types of communication links, such as telephone lines, power lines, or combinations thereof.

Typical systems of the preceding type are described in U.S. Pat. Nos. 3,942,170, Distribution Network Powerline Carrier Communication System; 3,702,460, Communication System for Electric Power Utility; 3,656,112, Utility Meter Remote Automatic Reading System; 3,924,224, Meter Reading System; and, 3,900,842, Remote Automatic Meter Reading and Control System.

Meter reading and control systems of the preceding type frequently have many terminal units connected to a single power line. A message generator transmits messages to these terminal units over the power line whereby each of the units simultaneously receives each transmitted message. In order for the terminal units to respond to the messages, they must each be able to recognize their own address. To address all of the terminal units on a single power line, a separate message must be transmitted for each terminal unit. Thus, it can be seen, when the quantity of terminal units on a power line numbers in the thousands, a considerable amount of addressing time is used, even with a high speed computer serving as the message generator.

While the individual addressing of terminal units is a desirable feature, and frequently essential, in the preceding types of systems, cost savings in equipment and message and data transmittal times can be realized by providing addressing means in each terminal unit which not only allows individual addressing, but extends the addressing capabilities of the system to the simultaneous addressing of all units in the system, as well as the simultaneous addressing of groups and sets of terminal units. A representative type of system which provides this extended addressing capability and which makes use of the present invention, is disclosed in U.S. Patent application Ser. No. 653,859, filed Jan. 30, 1976 entitled Automatic Remote Meter Reading and Control System, and assigned to the assignee of the present invention.

Thus, it can be seen that a need exists for improved apparatus for use in each of a plurality of terminal units or user devices which overcomes the shortcomings of the prior art by extending the addressing capabilities to many combinations of large quantities of such units when implemented into a system.

SUMMARY OF THE INVENTION

The present invention provides a data communication system having the aforementioned addressing capabilities by the provision of addressing apparatus or logic circuitry in each of a plurality of terminal units or controllable user devices which allows all units to be selectively addressable, either singularly, in groups, sets, or all at once.

A message generator, such as a digital computer or programmable controllable, transmits messages over a common communication link for simultaneous reception by all of the terminal units. Each message contains an address field of a prescribed number of binary bits and a mode field of at least one binary bit.

The contents or combinations of the states (1 and 0) of the address field binary bits in each message specify an address which is recognizable by the addressing apparatus in one, several groups or sets, or all of the terminal units. This allows either selective single addressing or simultaneous addressing of many combinations of the terminal units. The state of the mode field binary bit in each message establishes an address mode for the addressing apparatus in each terminal unit and, in part, extends the addressing capabilities of the present invention.

A message is received and stored in the addressing apparatus of each terminal unit, wherein the contents of the address and mode fields are decoded and/or compared with at least one address assigned to each terminal unit by the addressing apparatus. If a predetermined combination of address field binary bits, with a specified state of the mode field bit, is decoded, an enable signal is generated to enable all of the terminal units to simultaneously carry out their designed function(s).

A single terminal unit is enabled or selected by a comparison of the address field contents with a specified terminal unit address assigned by the addressing apparatus when the mode field bit is in a predetermined state.

To address or enable a set or first number of terminal units, certain ones of the address field bits are compared with corresponding address bits assigned by the addressing apparatus in each terminal unit of the system. The result of this comparison is compared with a predetermined state of the mode field bit and a specified combination of certain other ones of the address field binary bits. Those terminal units, wherein the results of this latter comparison are of a positive nature, will be addressed as a set.

A group or second number of terminal units, can also be enabled or selected by the present invention. This selection is accomplished by comparing the binary states of specified ones of the address field bits with corresponding bits representative of a group address assigned by the addressing apparatus. The result of this comparison is then compared with the state of the mode field bit. If the mode field bit is of a predetermined state and the results of the comparison are of a positive nature, those terminal units having matching addresses will be enabled as a group.

From the preceding, it can be seen that the present invention provides a data communication system having a flexible addressing structure which allows the selection of all or many groups and sets of terminal units as well as singular selection of terminal units when connected to a common communication medium such as telephone and power lines or a radio communication link.

It is therefore an object of the present invention to provide a data communication system having addressing apparatus for use in selectively addressing terminal units and controllable user devices having enhanced operating capabilities.

It is another object to provide addressing apparatus for use in each of a plurality of terminal units for the selective addressing of combinations of the terminal units.

It is another object to provide addressing logic circuitry in each of a plurality of terminal units capable of receiving messages containing addresses over a common communication link from a message generator with each terminal unit capable of recognizing a plurality of addresses to allow the selective addressing of combinations of the terminal units.

It is a still further object to provide addressing apparatus for use in each of a plurality of terminal units capable of receiving messages containing addresses and address mode information for directing the selective addressing of combinations of the terminal units.

BRIEF DESCRIPTION OF THE DRAWING

The present invention may be more readily understood by reference to the accompanying drawing in which:

FIG. 5 is a rectangular array illustrating in octal address notation the selection of combinations of the terminal units by the addressing apparatus of the present invention.

DESCRIPTION OF THE PREFERRED EMBODIMENT

Figure 1:
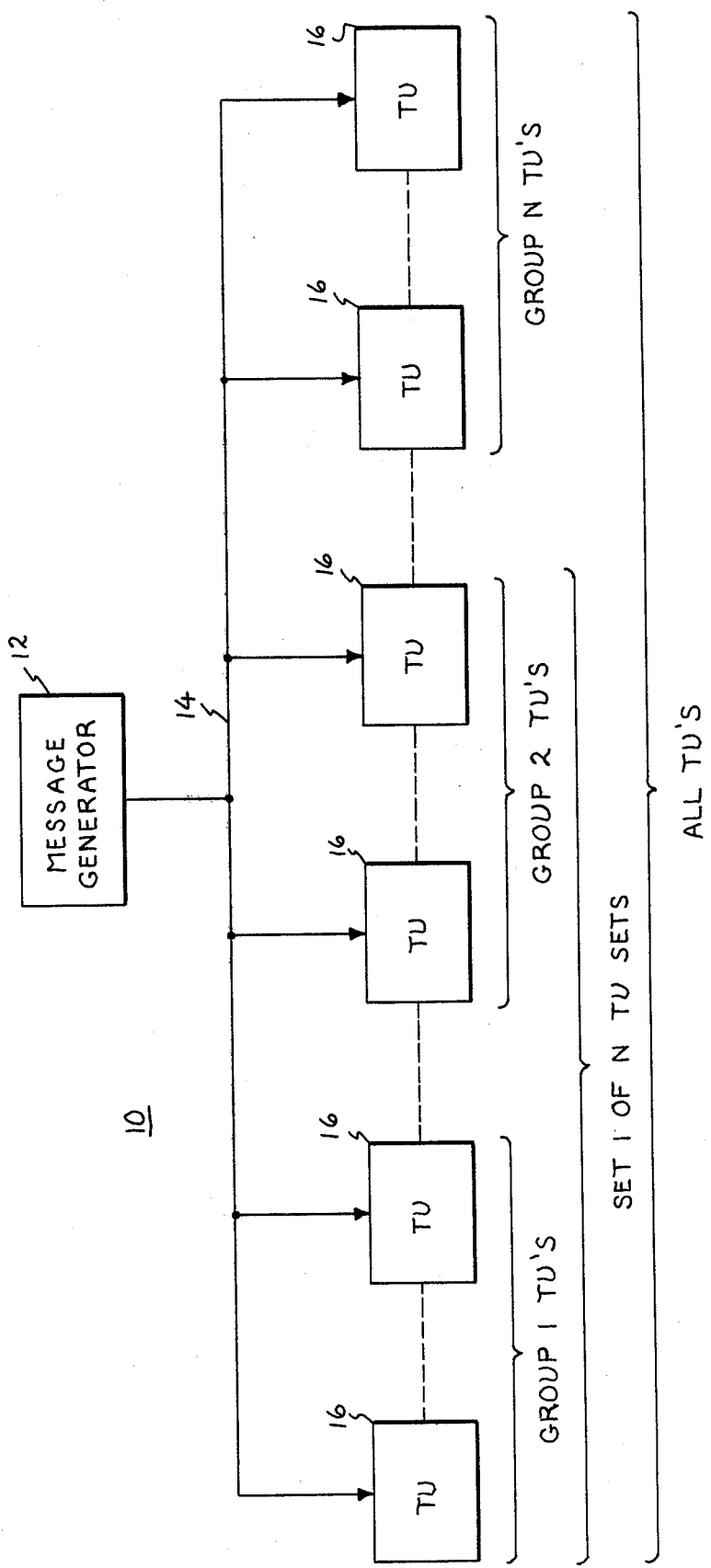
FIG. 1 is a major block diagram of a data communication system illustrating a plurality of the terminal units, incorporating the present invention, connected to a message generator via a common communication link.

Reference is now made to FIG. 1 which illustrates a data communication system, generally designated 10. A message generator 12, such as a digital computer or controller, provides messages over a common communication link 14, such as a power transmission line, to a plurality of simultaneously addressable terminal units 16 (TU) or devices, such as utility meter transponder units, tape recorders, displays, or the like.

In the system of FIG. 1, the message generator 12 generates messages which contain at least an address field of a specified number of binary bits, and a mode field which contains at least one binary bit for simultaneous reception by the terminal units 16. It is well known in the art that the messages received by the above devices normally contain command or function code information which specifies the operation(s) to be carried out by the devices. Since the present invention pertains only to the addressing of such devices to effect a selection of those devices, all further discussion of the message structure will be directed only to the address portion of the message(s).

Still referring to FIG. 1, the terminal units, hereinafter called TU's, can be selectively addressed either singularly, all at once, in groups or in sets. Addressing of the several combinations of TU's is illustrated by each TU and the appropriate notations below the brackets depicting all of the TU's and the various combinations of groups and sets of TU's.

Figure 2:
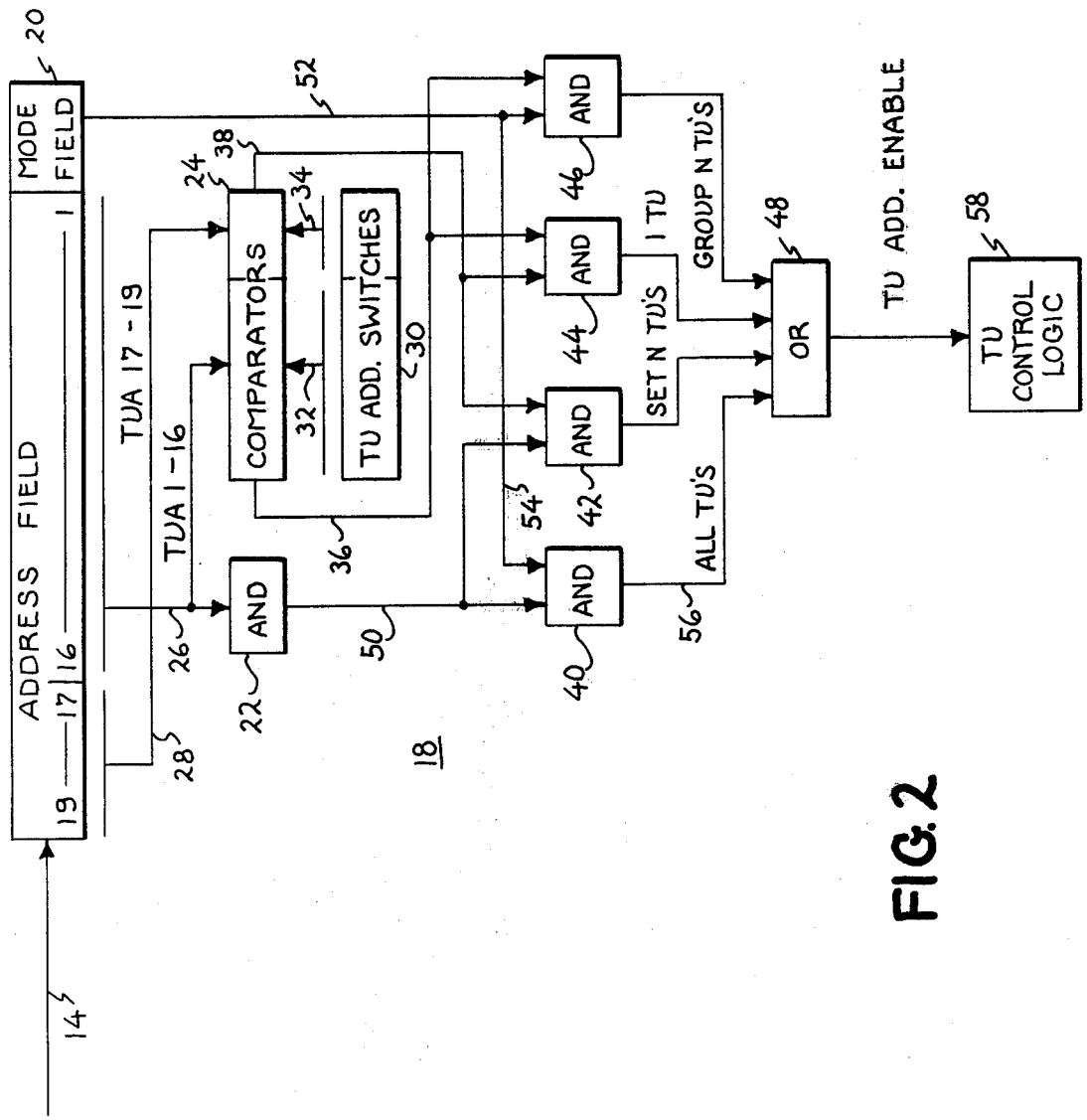
FIG. 2 is a detailed block diagram of the addressing apparatus of the present invention which is incorporated in each of the terminal units of FIG. 1.

Referring now to FIG. 2, there is illustrated in detailed logic diagram form an addressing apparatus 18 in accordance with the invention, for use in each of the TU's 16. Messages are received serially by a shift register or storage means 20 from the message generator 12 of FIG. 1 over communication line 14. While the register 20 is shown as receiving a message in serialized form over line 20, it will be understood by those skilled in the art that the register could also be loaded in parallel by a plurality of communication lines feeding each stage or binary bit position of the register.

As can be seen, the register 20 contains two portions illustrating the message address format, an address portion for containing the message address field bits 1–9 and a mode portion for retaining the mode field bit or bits. As previously mentioned, the message used in systems of the type in which the invention finds usage usually contains a command or function code portion. The register 20 does not illustrate this portion. However, for a representative terminal unit illustrating such a register for storing a complete message, reference is made to the aforementioned patent application Ser. No. 653,859.

Still referring to FIG. 2, the terminal unit address field bits TUA 1–16 are provided to a logic gate or element shown as an AND-gate 22 and to a comparator means designated comparators 24 via a plurality of conductors 26. Address field bits TUA 17–19 are provided to comparators 24 on a separate set of conductors 28.

The purpose of comparators 24 is to compare the binary states of the address field bits TUA 1–19 with the states of corresponding binary signals from an address signal generating means designated TU ADD. Switches 30. The address switches 30 provide address signals on conductors 32 to comparators 24 for comparison with corresponding address TUA 1–16. In a similar manner, address signals corresponding to address bits TUA 17–19 are provided to the comparators from the address switches 30 via conductors 34.

The comparator means 24 is capable of generating two output selection signals, one on each of two conductors 36 and 38. A first one of the selection signals is generated on conductor 36 whenever there is a comparison or equality between the address bits TUA 1–16 and the corresponding address signals on conductors 32 from switches 30. In a similar fashion, the second selection signal is generated on conductor 38 when there is a comparison between the address signals on conductors 34 and bits TUA 17–19 from register 20. The selection signals on conductors 36 and 38 can also be generated simultaneously if there is an equal comparison of the TUA 1-19 bits with the corresponding signals on conductors 32 and 34.

A gating means comprised generally of a plurality of logic or gating elements shown as AND-gates 22, 40, 42, 44, 46 and an OR-gate 48 receive address and mode field signals from register 20 and the selection signals from comparators 24.

The specified address field bits TUA 1-16 are provided to enable AND-gate 22 when those bits are of a predetermined combination, such as all binary 1's. When AND-gate 22 is enabled, its output, on conductor 50, achieves a binary 1 state as one enable input to AND-gate 40. The other input to AND-gate 40 is from the mode field bit of register 20 via conductors 52 and 54. If the mode field bit is in a binary 1 state, in conjunction with a binary 1 from gate 22, AND-gate 40 is enabled to provide a binary 1 ALL TU's signal on conductor 56.

Still referring to FIG. 2, the output of AND-gate 22 is also provided to AND-gate 42, which is enabled to generate a binary 1 SET N TU's signal by the presence of binary 1 signals from AND-gate 22 and the second selection signal on conductor 38 from the comparators 24.

A binary 1 signal, 1 TU, is generated by AND-gate 44 when that gate is enabled by the first and second selection signals on conductors 36 and 38 from comparators 24.

The AND-gate 46 receives the first selection signal on conductor 36 from comparators 24 and the mode field bit on conductor 52. AND-gate 46 is enabled when its input signals are both binary 1's to generate a binary 1 output signal designated Group N TU's.

Each of the output signals from AND-gates 40, 42, 44 and 46 are provided to OR-gate 48 to selectively enable that gate to generate a binary 1 TU ADD. Enable signal. This latter signal is provided to a TU (Terminal Unit) control logic 58 to enable that logic to perform its designed function or functions.

Figures 3, 4:
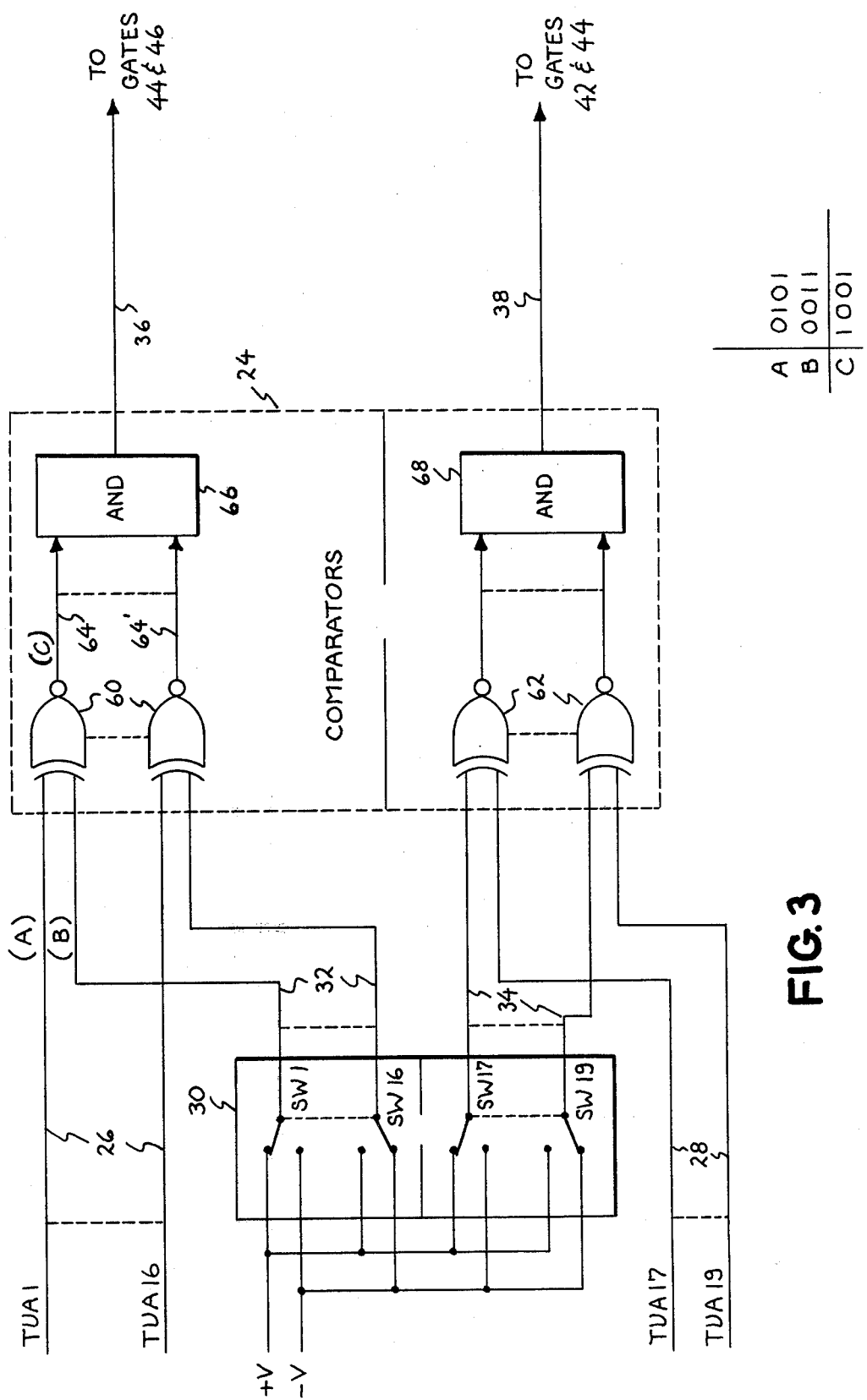
FIG. 3 is a logic schematic of the comparators and terminal unit address switches of FIG. 2.
FIG. 4 is a logic truth table for use in understanding the operation of the comparators of FIG. 3.

To more fully understand the operation of the addressing apparatus of the present invention, reference is now made to FIG. 3 which illustrates in logic schematic form the structures of the comparators 24 and the TU ADD. Switches 30 of FIG. 2.

As shown in FIG. 3, the address field signals TUA 1-16 are provided via conductors 26 to a corresponding plurality or group of exclusive NOR-gates 60 making up one half of comparators 24. Gates 60 also each receive a switch signal input via conductors 32 from switches SW1-SW16 of the TU ADD. Switches 30. The signals from SW1-SW16 correspond to the TUA 1-16 signals from register 20. In a similar fashion, the address field signals TUA 17-19 on conductors 28 are provided to a second group of Exclusive NOR-gates 62, which also receive corresponding address signals from switches SW17-SW19 of the TU ADD. Switches 30.

The operation of the comparators 24 can best be understood by reference to the logic truth table of FIG. 4 in conjunction with the inputs to the top Exclusive NOR-gate 60 of FIG. 3. In the left hand column of FIG. 4, the letters A and B represent input signals (A), (B) to gate 60 and C represents the output (C) of gate 60, where the binary 1's and 0's in the rows corresponding to A, B and C represent the possible binary bit combinations of inputs (A) and (B) to generate output (C). As can be seen in the truth table of FIG. 4, any time A and B are the same (both 0's or both 1's), C is a binary 1. Thus, by referring to FIG. 3, it can be seen if the TUA1 address bit (A) is a binary 1 and SW1 (B) (corresponding to TUA1) is in the position shown applying a binary 1 +V signal to gate 60, that gate is enabled to generate a binary 1 (C) output signal. If the sense of the signals, (A) and (B) to gate 60 are opposite (see FIG. 4), that gate will generate a binary 0 output.

All of the Exclusive NOR-gates 60 and 62 operate as just described. Thus, it can now be seen, how many address combinations can be assigned to a terminal unit by the switches SW1-SW19. As one example, assume that switches SW1-SW16 are all in the +V position applying binary 1 signals to their respective gates 60. Also assume that bits TUA1-16 of the received message are all binary 1's. As a result, there is a comparison between all of the assigned bits (SW-SW16) and the TUA1-16 bits, causing a binary 1 signal on each of conductors 64 and 64' to be applied to an AND-gate 66. In this instance AND-gate 66 is enabled to apply a binary 1 signal on conductor 36 to AND-gates 44 and 46.

As a further example, if it is assumed that SW1-SW16 are all in the -V position generating binary 0's and the TUA1-16 signals are all binary 0's, gates 60 will also be enabled to generate a binary 1 at the output of AND-gate 66.

Switches SW17-SW19 and the TUA 17-19 signals to gates 62 function to enable or disable an AND-gate 68 the same as just described for gate 66.

An important point to remember when analyzing the operation of comparators 24, is that, if the input signals to the individual groups of gates 60 and 62 are not equal (ie, they do not match) the output of those non-matching gates will be at a binary 0 causing the corresponding AND-gates 66 and 68 to generate a binary 0 output disabling signal. The input address signals to Exclusive Nor-gates 60 and 62 can be any combination of binary 1's and 0's and either half or both of the comparators 24 will be enabled to generate a binary 1 output so long as there is a match between that combination of binary 1's and 0's from the switches 30 (SW1-16 and SW17-19).

To illustrate the addressing versatility of the present invention, reference is now made to FIGS. 2 and 5. Referring first to FIG. 5, there is shown a rectangular array illustrating in octal notation how individual TU's and groups or sets of TU's can be selected or addressed. Each of the squares contains the octal address of a single TU. Each column represents a group N of 8 TU's, where each row represents a set N of ⅛ of all of the TU's.

The array of FIG. 5 provides the capability of addressing single TU's using octal addresses spanning a range of 0000000 to 1777767, where the left six digits correspond to TUA bits 1-16 and SW1-SW16 of switches 30, and the right most digit corresponds to TUA bits 17-19 and SW17-SW19 of switches 30. As an example, to address a terminal unit having an address of 1777761, the TU ADD. Switches SW1-SW16 would be set equal to the left six digits and SW17-19 would be set to 1, the octal value of the right most digit. Referring to FIG. 2, when the message generator sends a message to the register 20 containing the 1777761 address with the mode field bit set to binary 0, the comparators 24 detect a match and provide the selection signals to enable AND-gate 44, thus addressing or enabling that terminal unit by the generation of the 1 TU signal. Thus, it can be seen, that each terminal unit can be assigned its own address merely by a proper setting of the TU ADD. Switches. The only address that can not be used for individual terminal unit addressing is Octal 7 for the most right hand digit of bits 1–16. As will subsequently be described, this digit is used as part of the address for addressing all TU's and sets of TU's.

The addressing of any of eight TU's is accomplished using bits 1–16 with an octal address range of 000000 to 177776, while ignoring bits 17–19 by setting the mode field bit of the message to a binary 1. Any time a group of eight TU's is selected, AND-gate 46 (FIG. 2) will be enabled to generate the Group N TU's signal in those TU's having addresses set in their respective address switches 30 (SW1-SW16) which match the message address bits TUA1-16 while the mode field bit signal on conductor 52 is a binary 1. As previously explained, for the all TU's and sets addressing the most right hand digit of bits 1–16 can only have a maximum value of 6, with octal 7 being reserved.

Any set of TU's can be selected using the octal address range 1777770 to 1777777 with the mode field bit set to a binary 0 state. As can be seen, in set addressing the only digit which varies is the right most digit corresponding to bits 17–19. These three bits provide eight TU set addresses corresponding to the eight row addresses ($0_8$–$7_8$) of FIG. 5. Referring to FIG. 2, it can be seen that AND-gate 42 is enabled to generate the set N TU's signal whenever there is a match in the comparators 24 between any of these addresses in the message and a corresponding address set into the TU ADD. Switches.

All of the TU's are addressed using the octal address 177777 with the mode field bit set to a binary 1 state. This in effect, causes the gating logic of FIG. 2 to ignore the right most significant digit corresponding to bits 17–19 of the message. Referring to FIG. 2, it can be seen that all binary 1's (octal 177777) in the address field (TUA 1–16) enables AND-gate 22 which in turn, in conjunction with the binary 1 mode field signal, enables AND-gate 40 to generate the ALL TU's signal. It can now be seen how the right most significant digit of octal 7 is reserved for addressing all of the TU's and the sets of TU's.

In summary, the advantages realized by the incorporation of the invention in systems of the aforementioned types include a substantial savings in capital intensive message generating hardware and in the address recognition logic in each of the terminal units. In addition, the invention enables more economic operations resulting from the time saved by the reduction in the number of messages which have to be transmitted to address a given number of terminal units.

The foregoing is a description of an illustrative embodiment of the invention, and it is applicant's intention in the appended claims to cover all forms within the scope of the invention.

What is claimed is:

1. In a data communication system of the type including a plurality of simultaneously addressable remote terminal units in communication with a message generator, each message having an address field of a specified number of binary bits, combinations of which specify terminal unit addresses and a mode field containing at least one binary bit for specifying an address mode, apparatus in each of said remote terminal units for recognizing a plurality of addresses comprising:

(a) storage means for receiving messages from said message generator, said storage means having an address portion and a mode portion for storing the binary bits of the address and mode fields respectively of a received message;

(b) means for generating address signals representative of addresses assigned to the individual remote terminal units, the number of assignable addresses corresponding in number to at least the maximum number specifiable by the address field bits of said messages;

(c) comparator means in communication with the address portion of said storage means and said means for generating address signals, said comparator means selectively generating at least first and second output selection signals when a comparison exists between the contents of the address portion and an assigned address specified by said address signals; and (d) gating means responsive to specified binary bits of the address field and the mode field bit from said storage means and to said at least first and second output selection signals from said comparator means, said gating means selectively generating a terminal unit address enable signal for use by the respective terminal units in response to, (i) a first message received by said storage means to simultaneously address all terminal units in accordance with a predetermined combination of the specified binary bits of the address field when the mode field bit is in a first binary state, (ii) a second message received by said storage means to simultaneously address a first number of terminal units in accordance with a first output selection signal from said comparator means when the mode field bit is in said first binary state, (iii) a third message received by said storage means to address a second number of terminal units in response to said predetermined combination of said specified binary bits of the address field and a second output selection signal from said comparator means when the mode field bit is in a second binary state, and (iv) a fourth message received by said storage means to address a single terminal unit in response to the first and second output selection signals from said comparator means when the mode field bit is in said second state.

2. The apparatus in accordance with claim 1 wherein said storage means comprises a shift register.

3. The apparatus in accordance with claim 1 wherein said comparator means comprises first and second groups of comparator logic elements, with a logic element in each group receiving a signal representative of a binary bit from the address portion of said storage means and an address signal from said means for generating address signals, each address signal corresponding to a binary bit of the address portion of said storage means, and each comparator logic element generating an output signal when a comparison exists between each logic element's respective input signals, and each of said first and second groups of logic elements having a gating element associated therewith for generating said first and second output selection signals respectively when a comparison exists between all of the input signals to the comparator logic elements of the respective groups.

4. The apparatus in accordance with claim 1 wherein said gating means comprises a plurality of logic elements, a first one of said logic elements generating an output signal in response to said predetermined combination of the specified binary bits of the address field, a first pair of said logic elements, each receiving the output signal from said first one, with a one of said first pair receiving the mode field bit from said storage means and the other of said first pair receiving the second output selection signal from said comparator means, and a second pair of said plurality of logic elements each receiving the first output selection signal from said comparator means, with a one of said second pair receiving the second output selection signal and the other of said second pair receiving the mode field bit, said gating means further including a second logic element coupled to the output of each of the logic elements of said first and second pairs and responsive to output signals therefrom to selectively generate said terminal unit address enable signal.

5. Apparatus for use in each of a plurality of simultaneously addressable terminal units for recognizing addresses in messages provided thereto from an external source, each of said messages containing an address field of a specified number of binary bits, combinations of which specify terminal unit addresses, and a mode field containing at least one binary bit for specifying an address mode, said apparatus comprising:
   (a) storage means for receiving a message, said storage means having an address portion and a mode portion for storing the binary bits of the message address and mode fields respectively of a received message;
   (b) addressing means, said addressing means including a plurality of address assignment switches at least equal in number to the number of binary bits in the message address field in the address portion of said storage means for generating address signals in binary form representative of terminal unit addresses;
   (c) comparator means, including means for combining the address signals from said addressing means and the binary bit contents of the address portion of said storage means to selectively generate at least first and second output selection signals when a comparison exists between the contents of the address portion and the address signals as assigned by said switches; and
   (d) means for selectively generating a terminal unit address enable signal for addressing the respective terminal units in accordance with messages received by said storage means, said means for generating including,
      (i) first gating means responsive to a predetermined combination of specified ones of the address field bits and to a first binary state of the mode field bit to simultaneously address all terminal units having a first message stored in their respective storage means,
      (ii) a second gating means responsive to a first output selection signal from said comparator means and the first binary state of the mode field bit to simultaneously address a first number of terminal units having a second message in their respective storage means,
      (iii) a third gating means responsive to said predetermined combination of said specified ones of the address field bits from said storage means and a second output selection signal from said comparator means to simultaneously address a second number of terminal units having a third message in their respective storage means when the mode field bit is in a second state, and
      (iv) a fourth gating means responsive to the first and second output selection signals from said comparator means to address a single terminal unit having a fourth message in its respective storage means when the mode field bit is in said second state.

6. The apparatus in accordance with claim 5 wherein said storage means comprises a shift register.

7. The apparatus in accordance with claim 5 wherein the means for combining in said comparator means comprises first and second groups of comparator logic elements, with a logic element in each group receiving a signal representative of a binary bit from the address portion of said storage means and an address signal from said addressing means, each address signal corresponding to a binary bit of the address portion of said storage means, and each comparator logic element generating an output signal when a comparison exists between each logic element's respective input signals, and each of said first and second groups of logic elements having a gating element associated therewith for generating said first and second output selection signals respectively when a comparison exists between all of the input signals to the comparator logic elements of the respective groups.

8. The apparatus in accordance with claim 5 wherein said means for selectively generating further includes a logic element coupled to the output of each of said gating means for selectively generating said terminal unit address enable signal.

9. A data communication system comprising:
   (a) a message generator for generating messages, each message having an address field of a specified number of binary bits, combinations of which specify terminal unit addresses and a mode field bit containing at least one binary bit for specifying an address mode;
   (b) a plurality of simultaneously addressable terminal units in communication with said message generator, each of said terminal units including,
      (1) storage means for receiving messages from said message generator, said storage means having an address portion for storing the binary bits of the address and mode fields respectively of a received message,
      (2) means for generating address signals representative of addresses assigned to the individual remote terminal units, the number of assignable addresses corresponding in number to at least the maximum number specifiable by the address field bits of said messages,
      (3) comparator means in communication with the address portion of said storage means for generating address signals, said comparator means selectively generating at least first and second output selection signals when a comparison exists between the contents of the address portion of a received message and an assigned address specified by said address signals, and
      (4) gating means responsive to specified binary bits of the address field and the mode field bit from said storage means and to said at least first and second output selection signals from said comparator means, said gating means selectively generating a terminal unit address enable signal for use by the respective terminal units in response to,
- (i) a first message received by said storage means to simultaneously address all terminal units in accordance with a predetermined combination of said specified binary bits of the address field when the mode field bit is in a first binary state,
- (ii) a second message received by said storage means to simultaneously address a first number of terminal units in accordance with a first output signal from said comparator means when the mode field bit is in said first binary state,
- (iii) a third message received by said storage means to address a second number of terminal units in response to said predetermined combination of said specified binary bits of the address field and a second output selection signal from said comparator means when the mode field bit is in a second binary state, and
- (iv) a fourth message received by said storage means to address a single terminal unit in response to the first and second output selection signals from said comparator means when the mode field bit is in said second state.

10. The data communication system in accordance with claim 9 wherein said storage means comprises a shift register.

11. The data communication system in accordance with claim 9 wherein said comparator means comprises first and second groups of comparator logic elements, with a logic element in each group receiving a signal representative of a binary bit from the address portion of said storage means and an address signal from said means for generating address signals, each address signal corresponding to a binary bit of the address portion of said storage means, and each comparator logic element generating an output signal when a comparison exists between each logic element's respective input signals, and each of said first and second groups of logic elements having a gating element associated therewith for generating said first and second output selection signals respectively when a comparison exists between all of the input signals to the comparator logic elements of the respective groups.

12. The data communication system in accordance with claim 9 wherein said gating means comprises a plurality of logic elements, a first one of said logic elements generating an output signal in response to said predetermined combination of said specified binary bits of the address field, a first pair of said logic elements, each receiving the output signal from said first logic element, with a one of the logic elements of said first pair receiving the mode field bit from said storage means and the other logic element of said first pair receiving the second output selection signal from said comparator means, and a second pair of said plurality of logic elements, each receiving the first output selection signal from said comparator means, with a one of the logic elements of said second pair receiving the second output selection signal and the other logic element of said second pair receiving the mode field bit, said gating means further including a second logic element coupled to the output of each of the logic elements of said first and second pairs and responsive to output signals therefrom to selectively generate said terminal unit address enable signal.

13. Apparatus for use in a controllable device for recognizing addresses provided thereto in messages from an external source, each of said messages containing an address field of a specified number of binary bits, combinations of which specify addresses, and a mode field containing at least one binary bit for specifying an address mode, said apparatus comprising:
- (a) storage means for receiving a message, said storage means having an address portion and a mode portion for storing the binary bits of the message address and mode fields respectively of a received message,
- (b) means for generating address signals representative of addresses assigned to said controllable device, the number of assignable addresses corresponding in number to at least the maximum number specifiable by the address field binary bits of said messages;
- (c) comparator means in communication with the address portion of said storage means and said means for generating address signals, said comparator means selectively generating at least first and second output selection signals when a comparison exists between the binary bit contents of the address portion and an assigned address specified by said address signals; and
- (d) gating means receiving specified ones of the binary bits of the address field and the mode field bit from said storage means and said at least first and second output selection signals from said comparator means for selectively generating an address enable signal for enabling said controllable device to carry out its designed functions in response to,
  - (i) a first message received by said storage means, said first message having a predetermined combination of said specified ones of the binary bits in the address field and further having the mode field bit in a first binary state,
  - (ii) a second message received by said storage means, said second message having the mode field bit in said first binary state and effecting the generation of said first output selection signal from said comparator means in accordance with the states of the address field bits provided to said comparator means from the address portion of said storage means,
  - (iii) a third message received by said storage means, said third message having the mode field bit in a second binary state and effecting the generation of said second output selection signal from said comparator means as specified by said predetermined combination of said specified ones of the binary bits as provided to said comparator means from the address portion of said storage means, and
  - (iv) a fourth message received by said storage means, said fourth message having the mode field bit in said second state and effecting the generation of said first and second output selection signals from said comparator means in accordance with the states of the address field bits provided to said comparator means from the address portion of said storage means.

14. The apparatus in accordance with claim 13 wherein said storage means comprises a shift register.

15. The apparatus in accordance with claim 13 wherein said comparator means comprises first and second groups of comparator logic elements, with a logic element in each group receiving a signal representative of a binary bit from the address portion of said storage means and an address signal from said means for generating address signals, each address signal corresponding to a binary bit of the address portion of said storage means, and each comparator logic element generating an output signal when a comparison exists between each logic element's respective input signals, and each of said first and second groups of logic elements having a gating element associated therewith for generating said first and second output selection signals respectively when a comparison exists between all of the input signals to the comparator logic elements of the respective groups.

16. The apparatus in accordance with claim 13 wherein said gating means comprises a plurality of logic elements, a first one of said logic elements generating an output signal in response to said predetermined combination of said specified ones of the binary bits of the address field, a first pair of said logic elements, each receiving the output signal from said first logic element, with a one of said first pair of logic elements receiving the mode field bit from said storage means and the other logic element of said first pair receiving the second output selection signal from said comparator means, and a second pair of said plurality of logic elements each receiving the first output selection signal from said comparator means, with a one of said second pair of logic elements receiving the second output selection signal and the other logic element of said second pair receiving the mode field bit, said gating means further including a second logic element coupled to the output of each of said logic elements of said first and second pairs and responsive to output signals therefrom to selectively generate said address enable signal.

* * * * *